United States Patent
Boone et al.

(10) Patent No.: US 8,495,182 B1
(45) Date of Patent: Jul. 23, 2013

(54) SCALABLE SYSTEMS MANAGEMENT ABSTRACTION FRAMEWORK

(75) Inventors: Jim Boone, Huntersville, NC (US); Todd Olds, Huntersville, NC (US); Ryan Kapil, Charlotte, NC (US); Todd Ferris, Vancouver, WA (US); Mike Bauer, Winter Haven, FL (US)

(73) Assignee: Bank of America Corporation, Charlotte, NC (US)

( * ) Notice: Subject to any disclaimer, the term of this patent is extended or adjusted under 35 U.S.C. 154(b) by 984 days.

(21) Appl. No.: 12/061,260

(22) Filed: Apr. 2, 2008

(51) Int. Cl.
*G06F 15/177* (2006.01)

(52) U.S. Cl.
USPC .......................... 709/220; 709/221; 709/222

(58) Field of Classification Search
USPC .................. 709/205, 217, 219, 220–224
See application file for complete search history.

(56) References Cited

U.S. PATENT DOCUMENTS

| | | | |
|---|---|---|---|
| 5,805,891 A * | 9/1998 | Bizuneh et al. | 717/121 |
| 5,875,306 A * | 2/1999 | Bereiter | 709/220 |
| 6,282,175 B1 * | 8/2001 | Steele et al. | 370/254 |
| 6,799,210 B1 * | 9/2004 | Gentry et al. | 709/223 |
| 7,254,615 B2 * | 8/2007 | Taib et al. | 709/209 |
| 7,409,463 B2 * | 8/2008 | Ramachandran | 709/246 |
| 2003/0009553 A1 * | 1/2003 | Benfield et al. | 709/224 |
| 2007/0299953 A1 * | 12/2007 | Walker et al. | 709/223 |

* cited by examiner

*Primary Examiner* — Mohamed Ibrahim
(74) *Attorney, Agent, or Firm* — Michael A. Springs; Moore & Van Allen, PLLC; James C. Edwards

(57) ABSTRACT

A system and method for scalable systems management where a plurality of devices in a system is managed with a systems management infrastructure. An abstraction layer software application is implemented overlaying the systems management infrastructure for managing task distribution and status gathering for the plurality of devices in the system. A web interface is provided by the software application, the web interface being useable by a user to manage the task distribution and the status gathering. The task distribution may include gateway load balancing, distributing software updates, distributing new software for installation, or distributing software fixes. The status gathering may include performing a hardware inventory scan of a device, performing a software inventory scan of a device, identifying what software is installed on a device, or identifying types of hardware components in a device.

15 Claims, 11 Drawing Sheets

SCALABLE SYSTEMS MANAGEMENT ABSTRACTION FRAMEWORK

BACKGROUND OF THE INVENTION

The present invention is related to systems management, and more specifically to scalable systems management abstraction framework.

A system may include a plurality of devices. These devices may include computing devices, desktop systems, laptops, automatic teller machines (ATMs), servers, storage devices, input devices, output devices, hand held devices, etc. System managers many times use commercial systems management software to manage the devices in the system. This software enables a relatively small staff of associates to perform actions on a large number of managed devices through the use of automation. Companies, groups and individuals responsible for system management have long recognized the scaling limitations of all commercially available systems management software and tools. These limitations prevent users from managing hundreds-of-thousands of devices from a single interface.

System management software, such as software that may be licensed from IBM Tivoli called Tivoli Configuration Manager (TCM) is currently used in some systems to manage the system's devices. A typical TCM infrastructure defines a "management region" server for no more than 10,000 devices. This means that as a minimum, a system environment with 230,000 devices would require at least 23 TCM servers to service all managed devices. The TCM software does not scale sufficiently to allow users to manage all of the managed devices from a single interface.

Management regions can be "inter-connected" together with a hub server to create the appearance of a single management region. Unfortunately, there are severe practical limitations to the number of regions that can be joined together at one time. Therefore, using native TCM software to distribute software to all the managed devices in a system requires users to interact directly with multiple regional hubs, a very time consuming and tedious task. For example, if the native TCM solution was used to distribute software to all 230,000 devices, users would need to identify what management server a target device is managed from then add that target device to the list for the associated hub. This task would be repeated for all 230,000 target devices and result in a list for each hub. Users would then need to upload the list to each hub server, login in, submit their jobs, and then monitor the progress of each of the jobs from each hub server. The user could use a native GUI desktop for each hub server, but again, there are also severe limitations on the number of users that may use simultaneously use the desktop so this is not a practical option.

Further, the TCM application includes a very fine grain security model as part of the product. Unfortunately, the granularity of the security model translates to significant configuration complexity for the user. This complexity is further compounded when management regions are interconnected since it is now necessary to synchronize security settings across all inter-connected management regions.

BRIEF SUMMARY OF THE INVENTION

According to one aspect of the present invention, a method for scalable systems management includes managing a plurality of devices in a system with a systems management infrastructure, implementing an abstraction layer software application overlaying the systems management infrastructure for managing task distribution and status gathering for the plurality of devices in the system, and providing a web interface by the software application, the web interface being useable by a user to manage the task distribution and the status gathering.

According to another aspect of the present invention, a system for scalable systems management includes a plurality of devices, a systems management infrastructure, the systems management infrastructure managing the plurality of devices in the system, and a business process automation (BPA) server, the server executing an abstraction layer software application overlaying the systems management infrastructure for managing task distribution and status gathering for the plurality of devices in the system, the server providing a web interface for managing the task distribution and the status gathering.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
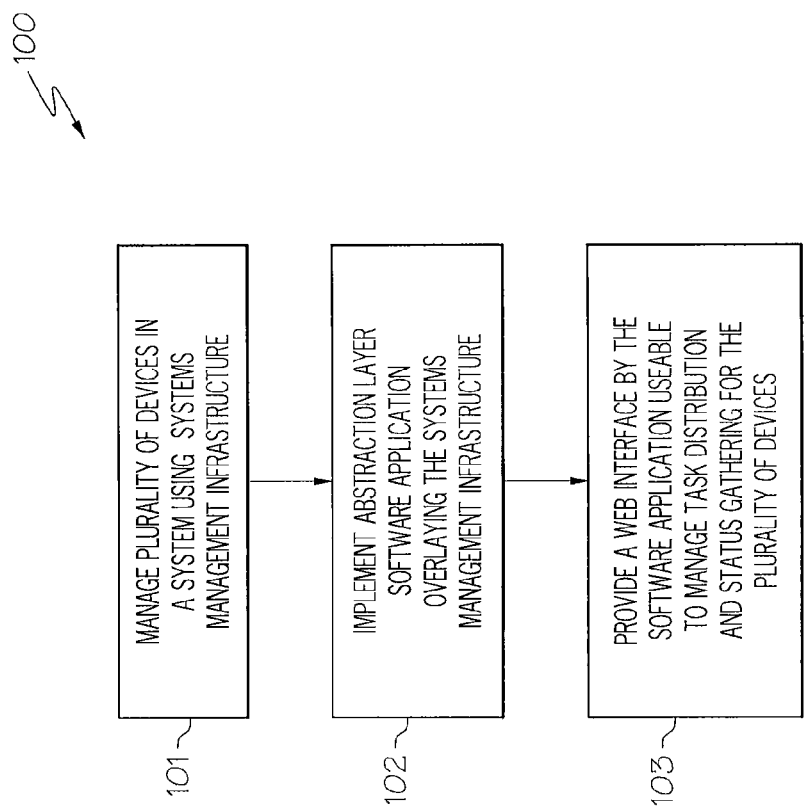
FIG. 1 is a flowchart of a process for a scaleable systems management according to an example embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, micro-code, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments according to the present invention include a software application that provides an abstraction layer that sits on top of a systems management infrastructure. To help illustrate embodiments of the present invention, the software application will be referred to as Business Process Automation (BPA). Further, for illustrative purposes, the systems management infrastructure used will be the IBM Tivoli Configuration Manager (TCM). The TCM is software that may be licensed from IBM to manage a plurality of devices in a system. However, embodiments of the present invention are not limited to the use of the IBM TCM as the systems management infrastructure as any type of systems management that manages devices in a system may be used and be within the scope of the present invention.

BPA according to embodiments of the present invention may provide users with a web interface for submitting software distribution and inventory scan jobs to any managed device without knowledge of which server (e.g., TCM server) the device is managed from. A user may monitor the status of the job from the same website unaware of the complexities that go on behind the scene that allows this to happen. BPA according to embodiments of the present invention may scale to any number of managed devices in a system providing a huge advantage over the native TCM solution.

Moreover, according to embodiments of the present invention, BPA allows for large device distribution lists and breaks large lists down into multiple regional lists and submits each regional list to the appropriate regions containing the devices on the list. This eliminates the current problems of having to execute batches several minutes apart (and expire several hours apart) since current techniques break down lists manually into small batches and send them via hub based distribution, and due to the limit on a number of devices associated with each batch, a deployment currently could equate to multiple hub deployments.

According to embodiments of the present invention using a web interface, a user may be provided with a federated view of managed devices in the system. Further, BPA provides for distributed task execution. In addition, BPA incorporates a centralized security system. These features will be described in further detail following.

One of the biggest challenges in using the native system management infrastructures, such as TCM, is that the user must know the details of where every device is managed from. There is no "federated" view of the managed devices. Embodiments according to the present invention provide a federated or abstracted view of the managed environment in which all managed devices can be seen from a single point. With a federated view, the user can essentially treat the management infrastructure as a black box; simply submitting jobs to the system and not worrying about how or where the job is executed. To perform a management function, the user may specify the devices to target, or upload a file that contains the labels for all targeted devices. Every device in the list may be examined to determine what TCM server that device is managed from. As the system works through the initial list, the system may split the list into target lists for each TCM management region. Once the system has completed processing, the original list may be decomposed into a list of targets for each management region that can be submitted for processing on the correct list.

Therefore, BPA embodiments according to the present invention provide tracking where a device is managed from in real time along with other dynamic information about the device in the TCM environment, where this function essentially "externalizes" the data that is maintained in a proprietary TCM database format for use in a relational database. Any standard SQL tool can be used to access the externalized data. Moreover, a federated view of all managed devices may be accomplished by tapping into the native TCM code such that every managed device sends a message to BPA automatically every time it logs into the environment or system. The message sent to BPA may contain detailed information about the device to be managed. In addition, BPA embodiments according to the present invention may verify that the user has permission to target the managed device with the specified software. BPA may include a sophisticated security system that prevents unauthorized management functions BPA embodiments according to the present invention further eliminate the need to rely upon the concept of a TCM hub which is one of the major limitations with the native TCM product.

Distributed task execution according to embodiments of the present invention may consist of two components: a task router and a task executor. The task router component virtualizes the network location of the TCM server where a task executes. When a task is submitted for execution, the task router may lookup the network location where the task must execute and then submit the task for execution to the appropriate task executor. Once the task completes execution, the results may be returned to the calling function. A task router according to embodiments of the present invention may include the capability to securely serialize and de-serialize the task objects that are sent across the network.

A task executor component according to embodiments of the present invention may be software that runs as a software agent on each TCM server. Whenever the BPA application needs to execute a task on the server, the task may be sent across the network to the task executor where it may be executed on the host operating system. The task executor can execute any task on the host operating system under the security credentials of the agent. Communications between the BPA server and the task executor may be architected as secured Service Oriented Architecture (SOA) remote procedure method calls.

According to embodiments of the present invention, a task executor may have two modes of execution: synchronous and asynchronous. Synchronous tasks may be executed immediately and the results of the task execution may be returned to the BPA server after the task has completed execution. Asynchronous tasks may be submitted into a priority queue where they are executed based upon heuristics specified for each task. Heuristics may include, for example, limits on the total number of tasks executing at one time, limits on a number of unique tasks executing at one time, conditional execution only if other specified tasks are not executing, etc.

A BPA application according to embodiments of the present invention abstracts security to eliminate the scalability issue mentioned previously regarding the TCM security model. Instead of requiring security to be set exclusively in every management region, BPA instead may bypasses the native TCM security by executing all tasks on the task router as a privileged TCM user. The responsibility for securing users, managed devices, and other resources may therefore be assumed by the BPA application. This abstraction homogenizes the security settings so that they are the same regardless of the number of management regions defined to the system. According to embodiments of the present invention, the security system may cross-cut all of the functionality of BPA and therefore weaved throughout the application, however may be a major component of the application.

FIG. 1 shows a flowchart of a process for a scaleable systems management according to an example embodiment of the present invention. In the process 100 in block 101, a plurality of devices in a system may be managed using a systems management infrastructure. In block 102, an abstraction layer software application may be implemented overlaying the systems management infrastructure. In block 103, a web interface may be provided by the software application where the web interface may be used to manage task distribution and status gathering for the plurality of devices. The devices may be any type device on a network or in a system.

Figure 2:
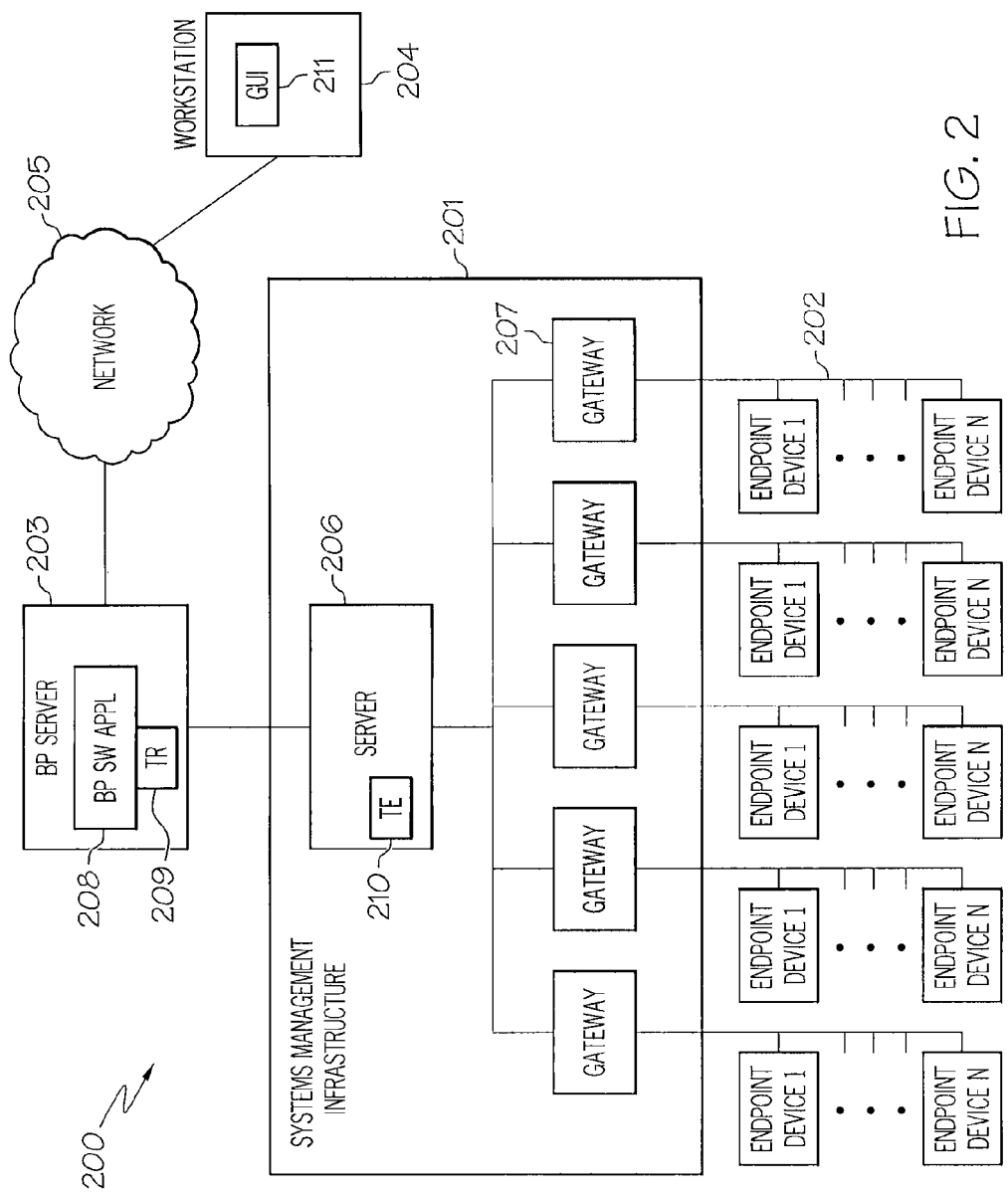
FIG. 2 is a system for a scaleable systems management according to an example embodiment of the present invention.

FIG. 2 shows a system for a scaleable systems management according to an example embodiment of the present invention. The system 200 may include a systems management infrastructure 201 that manages a plurality of endpoint devices 202, and a server 203 that include a software application 208. The software application 208 provides an abstraction layer that sits on top of the systems management infrastructure 201. The systems management infrastructure 201 may include one or more servers 206 that are interconnected to one or more gateways 207. Each gateway 207 may be interconnected to a plurality of endpoint devices 202 in a particular region (e.g., Tivoli management region (TMR)). The server 203 executes the abstraction layer software application 208 that overlays the system management infrastructure 201 for managing task distribution and status gathering for the plurality of devices 202 in the system 200. The server 203 provides a web interface for managing the task distribution in the status gathering.

As noted, the server 203 may include a software application 208 and a task router 209. The task router 209 may identify a network location where a task must execute when a task is submitted for execution. The task router 209 submits each task for execution to an appropriate task executer 210. Although one systems management infrastructure server 206 has been shown, multiple servers may be included in a systems management infrastructure 201 where each server 206 includes a task executer 210.

Further, a workstation 204 may include a user interface 211 for viewing a federated view of the plurality of endpoint devices 202. A workstation 204 may be interconnected to the BP server 203 via a network 205 such as, for example, the Internet. Each task executer 210 may be capable of executing in an asynchronous mode where each task may be submitted to a priority queue for execution, or in an asynchronous mode where a task may be executed immediately and the result from the task execution sent to the BP server 203 after completion. Each task submitted to the priority queue for execution may be executed based on a number of factors, such as, for example, a limit on a total number of task executing every time, a limit on a number of unique tasks executing at one time, a conditional execution only if other specific tasks are not executed, etc. The plurality of endpoint devices 202 may include any of many types of devices that may be part of a network or system such as, for example, computing devices, desktop systems, laptops, Automatic Teller Machines (ATMs), servers, storage devices, input devices, output devices, etc.

Figure 3:
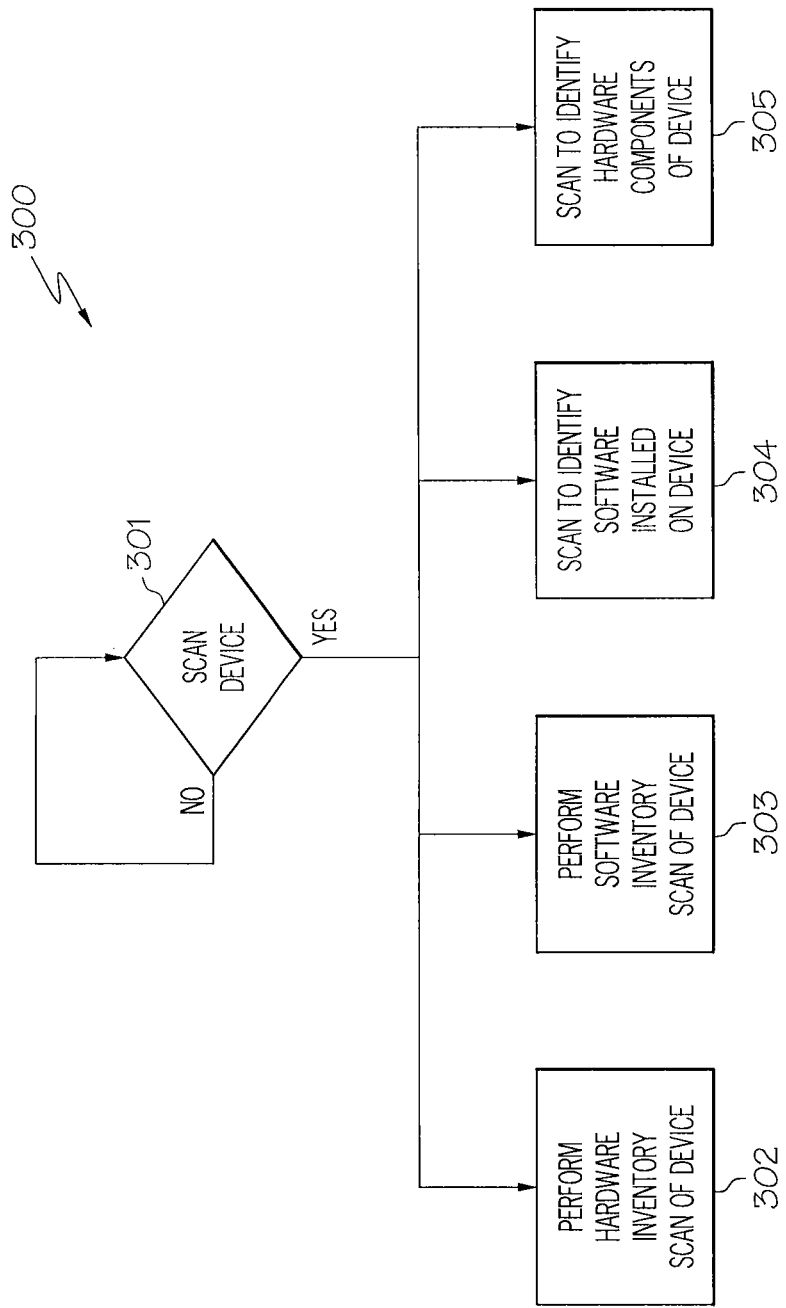
FIG. 3 is a flowchart of a process for status gathering according to an example embodiment of the present invention.

FIG. 3 shows a flowchart of a process for status gathering according to an example embodiment of the present invention. In the process 300 in block 301, it may be determined if status is desired from a particular device via scanning the device and if so, then a variety of different types of status gathering scans may be performed. In block 302, a hardware inventory scan of the device may be performed. Further, in block 303, a software inventory scan of the device may be performed. In block 304, a scan may be performed to identify software currently installed on the device. In block 305, a scan may be performed to identify hardware components of a device, for example, size and type of memory, CPU speed, input/output devices, etc.

Figure 4:
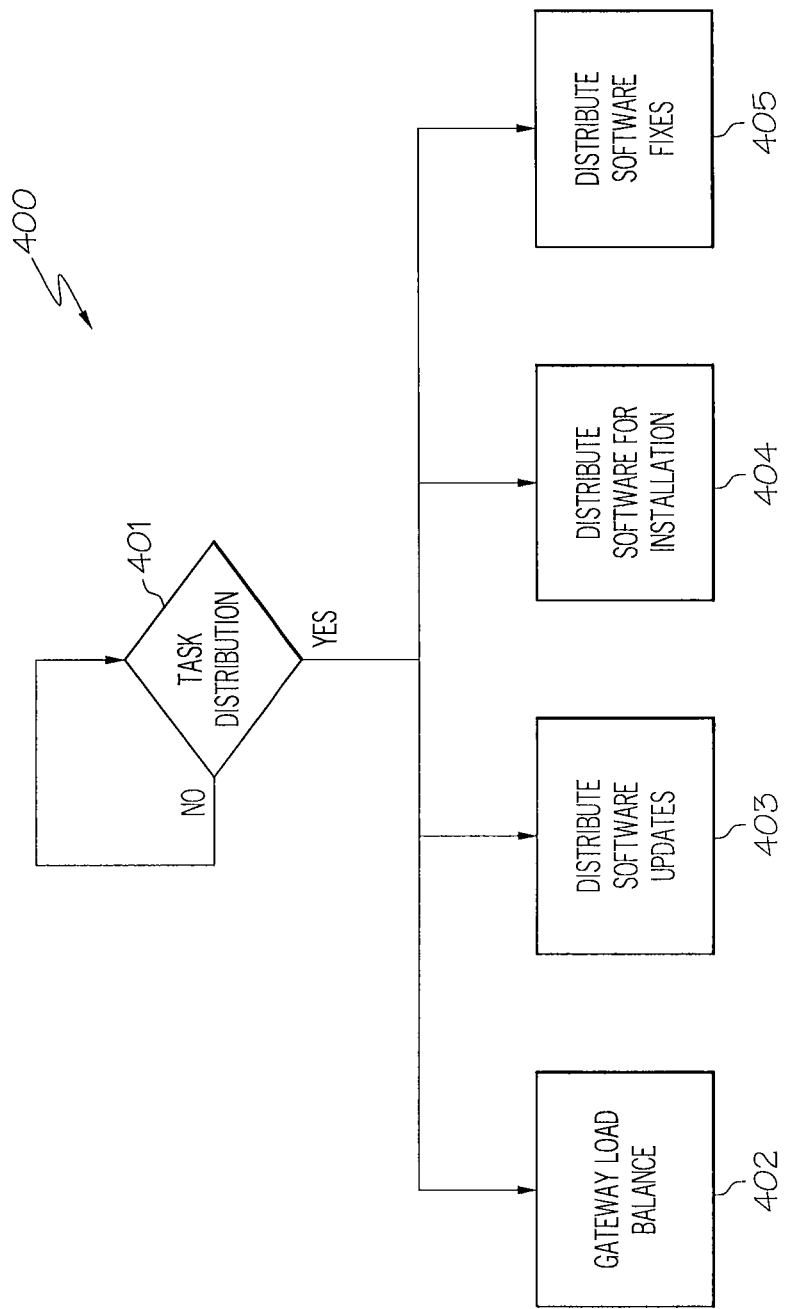
FIG. 4 is a flowchart of a process for task distribution according to an example embodiment of the present invention.

FIG. 4 shows a flowchart of a process for task distribution according to an example embodiment of the present invention. In the process 400 in block 401, it may be determined if task distribution is to be performed and if so, a variety of different task distributions may be performed. In block 402, tasks may be distributed for load balancing gateways in the systems management infrastructure. In block 403, tasks may be distributed for providing software updates to one or more devices in a system. In block 404, tasks may be distributed for installing software on one or more devices. In block 405, tasks may be distributed for providing software fixes to one or more devices.

As noted previously, to help illustrate embodiments according to the present invention, the IBM TCM will be used as the systems management infrastructure. Therefore, specific details related to the TCM such as commands, instructions, etc. will be used in the following descriptions to help illustrate embodiments of the present invention.

Figure 5:
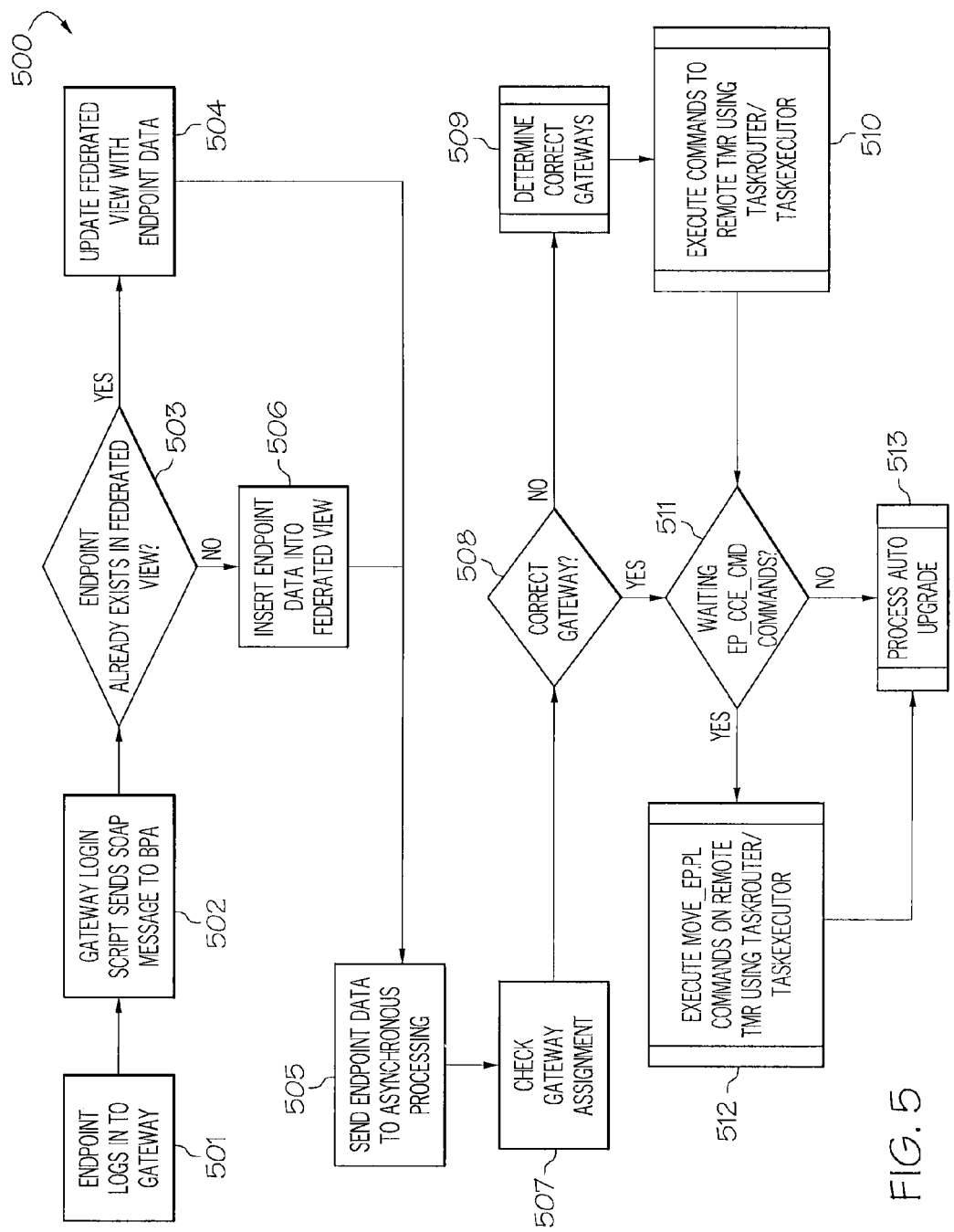
FIG. 5 is a flowchart of a process for handling new endpoints according to an example embodiment of the present invention.

FIG. 5 shows a flowchart of a process for handling new endpoints according to an example embodiment of the present invention. In the process 500 in block 501, an endpoint may login to a gateway. In block 502, a gateway login script may send a SOAP message to BPA. In block 503, it may be determined if the endpoint already exists in the federated view and if so, then in block 504, the federated view may be updated with the endpoint data. If the endpoint does not exist in the federated view, then in block 506 the endpoint data may be inserted into the federated view. After the update or insertion, then in block 505, the endpoint data may be sent for asynchronous processing. In block 507, a gateway assignment may be checked. Then in block 508, it may be determined if the gateway is correct and if not, in block 509, correct gateways may be determined and in block 510 commands to a remote TMR may be executed using the task router and task executer. Then in block 511, the process may also wait for the ep_cce_cmd commands. In this regard, a database may be queried to see if this particular endpoint has any commands that need to be executed on it. If no commands are received, then in block 513, an automatic upgrade may be processed. If commands are received then in block 512 move_ep_pl commands may be executed on a remote TMR using the task router/task executer.

When a Tivoli endpoint logs into the environment, this triggers the gateway to send a SOAP message to a BPA web service. The message sent to BPA may contain detailed information about the device to be managed, for example, endpoint label, endpoint object identification (OID), gateway OID, IP address, region (TMR) number, endpoint version, hardware id, etc. This above information may be then inserted or updated in the federated view for use in various other processes allowing BPA to access, manipulate and track endpoint data external to Tivoli's proprietary interfaces, which are not adequately scalable to the needs of many systems.

After the endpoint data is persisted, it may be sent to a messaging service, for example a Java Messaging Service topic, for asynchronous processing. The endpoint may be checked for correct gateway assignment, and may be moved to the correct gateway by sending commands asynchronously via the TaskRouter/TaskExecutor components if it is determined that the assignment is not correct. According to embodiments of the present invention, an automation component may check a persistent store to see if there are processing commands that should be executed for the particular endpoint and if so send the commands asynchronously via the TaskRouter/TaskExecutor components. The endpoint's version may be checked to see if it should upgraded to a new version.

Figure 6:
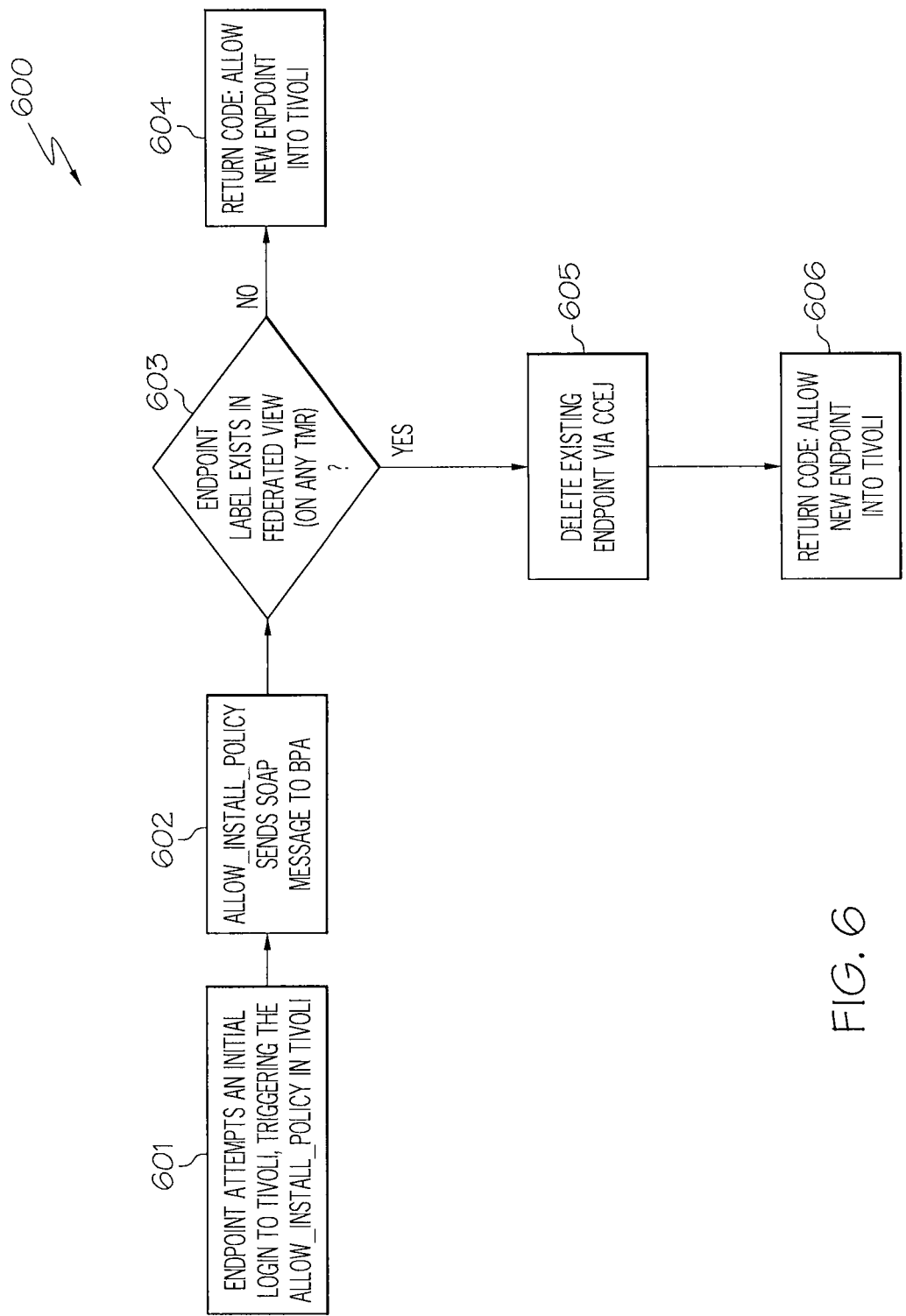
FIG. 6 is a flowchart of a process for handling new endpoint devices according to an example embodiment of the present invention.

FIG. 6 shows a flowchart of a process for handling new endpoint devices according to an example embodiment of the present invention. In the process 600, in block 601, a new endpoint device may attempt an initial login to Tivoli, triggering the allow_install_policy in Tivoli. Then in block 602, the allow_install_policy may send an SOAP message to BPA. In block 603, it may be determined if the endpoint device label exists in the federated view (in any TMR) and if not, in block 604, a return code to allow the new endpoint into Tivoli may be generated. If the endpoint does exist in the federated view, then in block 605, the existing endpoint may be deleted via a Central Command Execution Engine (CCEJ) and in block 606, a code may be returned allowing the new endpoint into Tivoli. CCEJ is an example asynchronous task execution engine in java that uses a prioritized queue.

An endpoint label for a new Tivoli endpoint that is attempting to join the TCM environment should be unique within a TMR. However, since a system environment may be made up of many TMRs there is the potential for the same endpoint label to exist on different TMRs. This may create a problem in that if a user initiates an action for a specific endpoint then BPA would not know which of the many endpoints with the same label the user intended to target. Thus, BPA ensures that each endpoint label exists on only 1 TMR (i.e., is unique in the entire system TCM environment). New endpoints in Tivoli automatically run a script called the allow_install_policy. This is part of the Tivoli functionality. According to embodiments of the present invention, the allow_install_policy script may be set to send a SOAP message to BPA.

According to embodiments of the present invention, BPA may query the endpoints federated view to determine all existing endpoints that have the same endpoint label. Each TMR that has an existing endpoint may be recorded. If there are no existing endpoints with the same label as the new endpoint then the SOAP message returns and the allow_install_policy allows the new endpoint into the TMR. For every existing endpoint with the same endpoint label the rest of the process is executed. A task may be sent to CCEJ that deletes the existing endpoint from the TMR where it resides. A return may be then sent to the allow_install_policy and the new endpoint allowed into the TCM environment. This process ensures that each endpoint label is unique across all TMRs.

Figure 7:
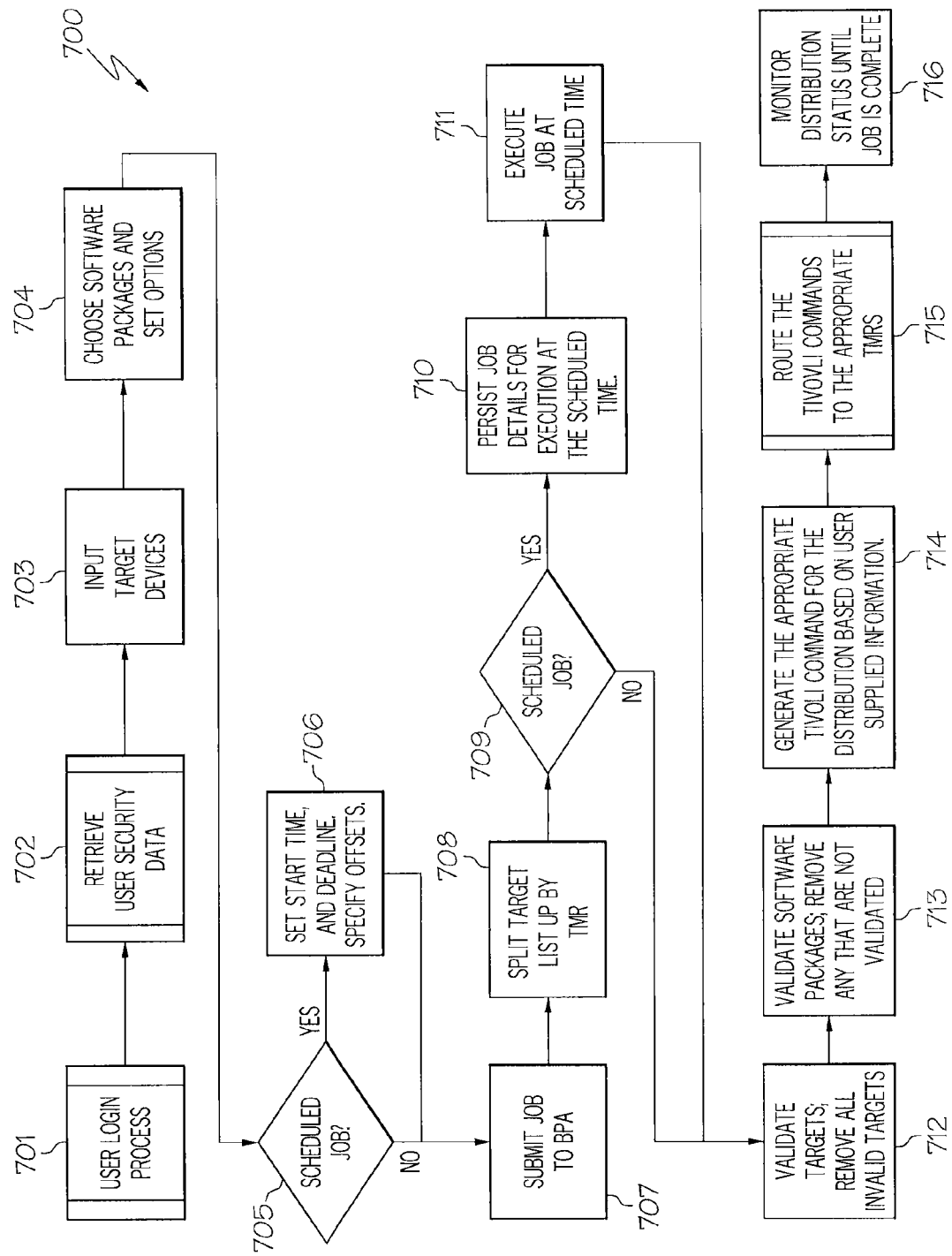
FIG. 7 is a flowchart of a process for a software distribution flow according to an example embodiment of the present invention.

FIG. 7 shows a flowchart of a process for a software distribution flow according to an example embodiment of the present invention. In the process 700, in block 701, a user may initiate a login process. In block 702, user security data may be retrieved. In block 703, the target devices may be input by the user. In block 704, desired software packages may be chosen and desired options may be set. Then in block 705, it may be determined if a job is to be scheduled and if so, in block 706, a start time and deadline may be set and offsets (related to current time zone) specified. Then in block 707, the job may be submitted to BPA. If the job is not to be scheduled, then in block 707, the job may be submitted to BPA. Then in block 708, a list of targeted endpoint devices may be split up by TMR. In block 709, it may be determined if this is a scheduled job and if so, in block 710, job details for execution may be saved at the scheduled time and, in block 711, the job may be executed at the scheduled time. Then in block 712, the targeted endpoint devices may be validated and all invalid targets removed. In block 709, if this is not a scheduled job, then in block 712, the targets may be validated and all invalid targets removed. Then in block 713, any software packages may be validated and any that are not validated may be removed. In block 714, the appropriate Tivoli command for the distribution may be generated based on user supplied information. In block 715, Tivoli commands may be routed to the appropriate TMRs. Then in block 716, the distribution status may be monitored until the job is complete.

Software distribution is the process by which a software package (e.g., Microsoft Word) is delivered (i.e., installed) on a Tivoli endpoint. The software distribution process may be initiated via a series of web pages in a web browser. This makes the user interface very scalable, in contrast to the native Tivoli user interface. When a user logins in to the web page site the user's credentials may be generated and validated. This ensures the user has permission to initiate software distributions and what types of distributions the user is authorized for. The user may specify the Tivoli endpoints to be targeted by typing in the endpoint labels (if a small number) or by uploading a text file containing any number of targets. The user specifies what software package(s) and any desired options pertaining to the software package. If the job is to be scheduled then that information is specified.

As noted, each scheduled job may specify the start time, the deadline time, and associated offsets. Offsets specify what location the start/deadline times are relative to. Options may be, for example, "Local" or "Central". This is relevant since according to embodiments of the present invention, the system TCM environment may span multiple time zones. When a start time is specified as 2:00 BPA must know what time zone that is relative to. For example, an offset of "Central" may designate that all of the TMRs in various time zones will execute the job at the same instant in time (i.e., 2:00 Central time zone). Therefore, a Pacific time zone TMR would actually execute the job at 00:00 Pacific time). "Local" may designate that each TMR should execute the job at the specified time relative to its own time zone (i.e., the job will execute at 2:00 Central time on Central time zone TMRs, 2:00 Pacific time on Pacific time zone TMRs, etc.).

Embodiments according to the present invention provide the ability to schedule "Local" times, in contrast to the Tivoli product where this capability is not supported. This enables the user to schedule a job to occur at a given "local" endpoint time without knowing the endpoint's physical or TMR location. The deadline value may specify when the software distribution should stop, if not already completed. The "Central" and "Local" time zone discussion above may apply to the deadline value also in embodiments according to the present invention.

Once a user has submitted a job to BPA from a web page, BPA may split the target list up into per-TMR target lists using the federated endpoint view. If the job is scheduled then it is saved and the appropriate start times are entered into a scheduler service for execution at the correct time(s). Before actually submitting the distribution via Tivoli, the endpoints and software package(s) may be validated. The endpoints may be validated as existing and the user security access to the endpoint may be confirmed. Any targets that don't exist or are restricted from the user may be removed from the target list. The same may occur for software package(s). If any software package does not exist or the user does not have appropriate security access to it then the software package may be removed from the job.

The user-specified software package options may be used to generate the appropriate Tivoli command for the distribution. The command may be executed on the TMR via the task router. The job status may be monitored by querying a status database table that Tivoli maintains. The status information may be displayed to the user via the web pages accessible from the software distribution BPA server.

Figure 8:
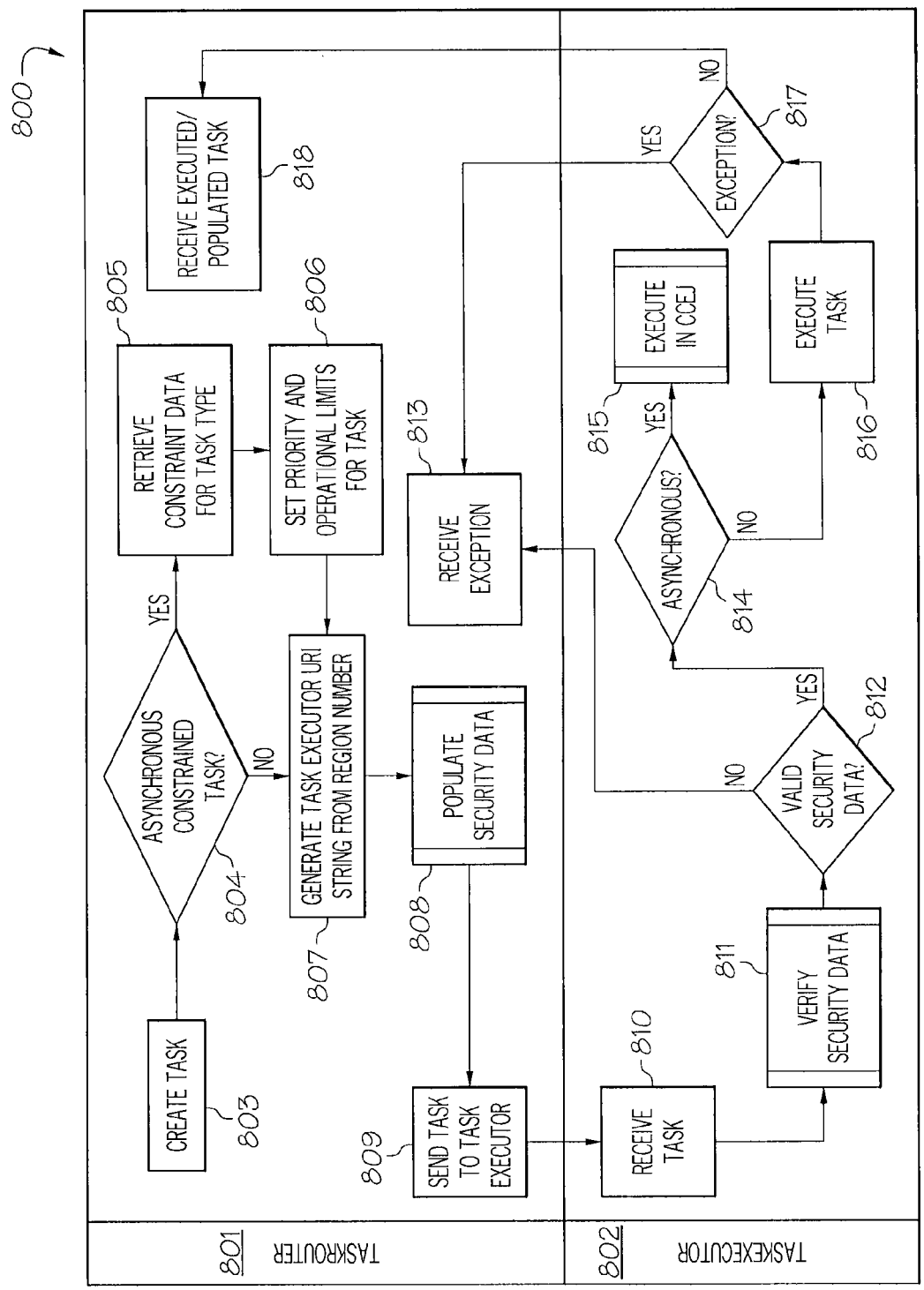
FIG. 8 is a flowchart of a process for remote task execution according to an example embodiment of the present invention.

FIG. 8 shows a flowchart of a process for remote task execution according to an example embodiment of the present invention. The process 800 may include activities executed by a task router 801 and tasks executed by a task executor 802. In the task executor 801, in block 803, a task may be created. Then in block 804, it may be determined if the task is an asynchronous constrained task, and if so, in block 805, any constraint data may be retrieved for task type. Then in block 806, a priority and operational limits for the task may be set and in block 807, a task executor, Uniform Resource Identifier (URI) string may be generated from a region number. If in block 804, it is determined that this is not an asynchronous task then in block 807, a task executor URI string may be generated from a region number. Then in block 808, security data may be populated. Then in block 809, the task may be sent to the task executor 802.

In the task executor 802, in block 810, the task executor may receive the task and then in block 811, may verify the security data. Then in block 812, in may be determined if the security data is valid and if not, the process moves to the task router 813 where the user may receive an exception. If the security data is valid then in the task executor 802, in block 814, it may be determined if the task is asynchronous, and if so, then in block 815, the task may execute in CCEJ. If the task is not asynchronous then in block 816, the task may be executed. In block 817, it may be determined if there has been an exception and the process then moves back to the task router 801. If there has been an exception, then in the task router 801 in block 813, the user may receive the exception. If there has not been an exception then in the task router 801 in block 818, the user may receive the executed/populated task.

According to embodiments of the present invention, a TaskRouter is the client or requestor and TaskExecutor is the service or provider. A logical entity utilized in the process in FIG. 8 is the task, which is used to encapsulate commands that are created for execution on a remote node, as well as store standard output, standard error, and the return codes that are populated as a result of the command execution. If an exception is encountered while executing a command, then it may be stored in the task as well.

Task creation occurs in the taskrouter. The commands for the task to execute may be stored as a string array. Environmental variables may be set before execution. An asynchronous task may also be referred to as being constrained. If a Task is asynchronous it may be populated with additional data that defines various execution constraints the task is subject to when it is executed by a remote CCEJ component. Task constraints may include, for example, a priority, an optional timeout, a set of operational limits that may be imposed on the task execution, etc. The operational limits for each constrained task type may be retrieved from a component responsible for managing valid CCEJ commands. This component is capable of contacting the master configuration server to load the most current command set. Once the URI of the remote execution environment is generated, the task to be executed may be serialized into a SOAP message payload and populated with encrypted user/password data in the message header. The task SOAP message may be then sent to a remote TaskExecutor. If the task is synchronous, the TaskExecutor may then receive the executed/populated task when the remote execution is complete.

According to embodiments of the present invention, a TaskExecutor service may reside on a remote node (TMR) and listen for task execution requests. When a request is received, the service may first check if the security data to verify it is valid. If the security is not valid, an exception may be generated and a SOAP fault may be returned to the service requester. If the security is valid and the task to be executed is not constrained, the TaskExecutor may execute the method on the supplied task which encapsulates the command to be executed. A task object may be returned in a SOAP message with the results of the command execution stored in the instance variables of the object. If the task is asynchronous/constrained, it may be passed to the CCEJ component for execution. No return value may be given or expected in this case. If something unforeseen occurs, an exception may be generated and a SOAP fault may be returned to the service requester.

Figure 9:
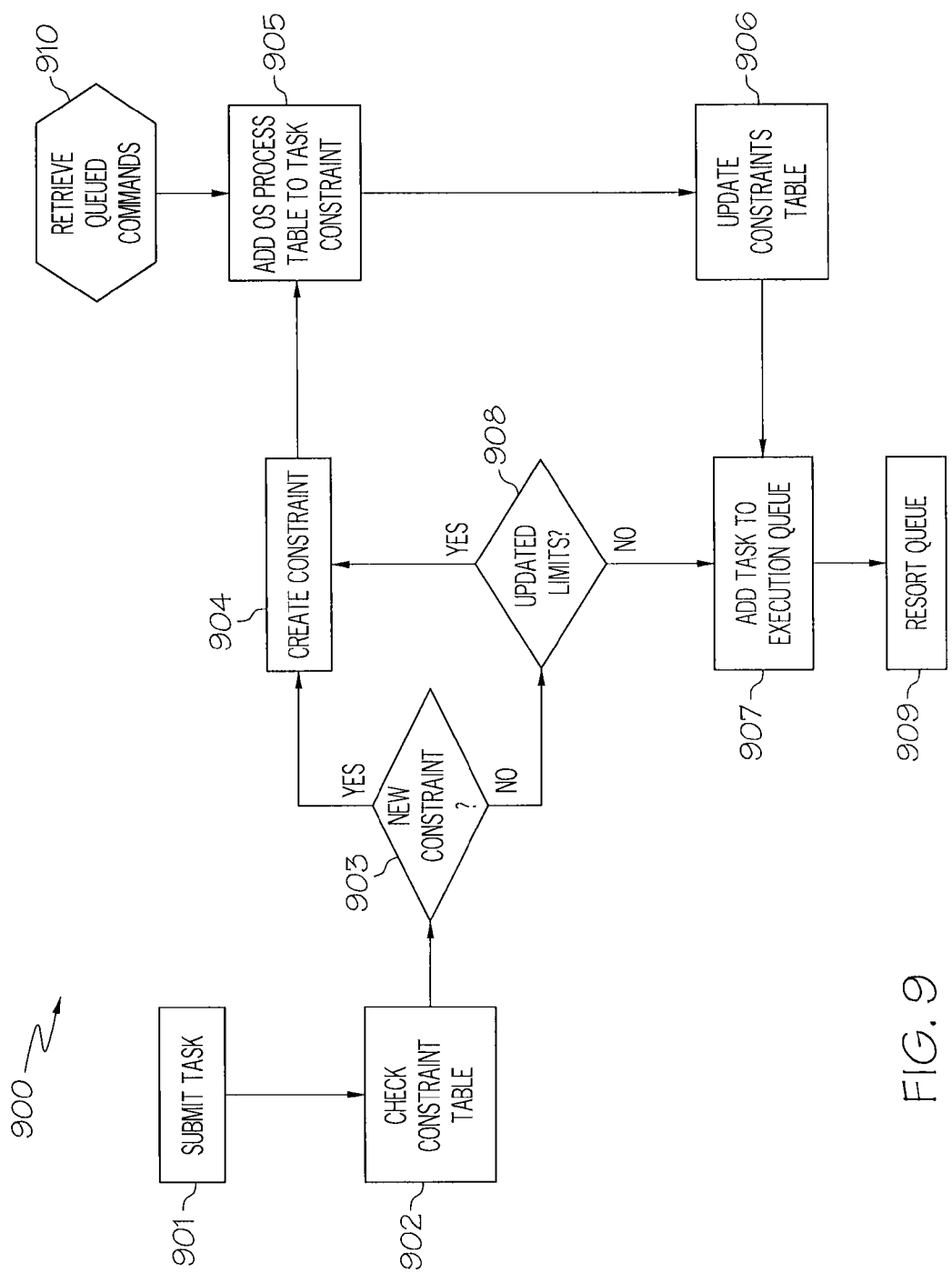
FIG. 9 is a flowchart of a process for Central Command Execution Engine in Java (CCEJ) task submission according to an example embodiment of the present invention.

FIG. 9 shows a flowchart of a process for CCEJ task submission according to an example embodiment of the present invention. In the process 900, in block 901, a task may be submitted. In block 902, a constraint table may be checked. Then in block 903, it may be determined whether there is a new constraint and if so, then in block 904, a new constraint may be created. In block 905 an operating system (OS) process table may be added to the task constraint and in block 906, the constraints table may be updated. If in block 903 there is not a new constraint then in block 908, it may be determined if limits have been updated and if so, the process proceeds to block 904 where a constraint is created and then to block 905 where the OS process table may be added to the task constraint, and then to block 906 where the constraints table may be updated.

If in block 908 there are no updated limits then in block 907, the task may be added to the execution queue and then in block 909, the queue is resorted. Moreover, independently, in block 910, queue commands may be retrieved and then in block 905, an OS process table may be added to the task constraint, and in block 906, the constraints table updated, in block 907, the task added to the execution queue, and in block 909, the queue resorted.

Therefore, according to embodiments of the present invention, when a task is submitted to CCEJ, it may be first checked whether the constraint values associated with the task command already exists in an in-memory constraints table. If it doesn't exist, a taskconstraint may be created. The new taskconstraint may be given a reference to the OS process table which may allow the taskcontraint to determine if one or more constrained processes are currently executing as indicated in the operating system process table. This may be accomplished by taking a snapshot of the process table and storing it for a configurable time. The snapshot may be updated whenever it becomes stale. For efficiency, a polling thread may sleep until needed and wake up and take a snapshot only when necessary. On a Windows system, the object may use the ntprocinfo command to list the process table, therefore, it should be present on the system. For all other operating systems, the command ps-ef may be used.

If the in-memory constraints table already contains a taskconstraint for the task command, the limits for the taskconstraint may be checked to see if they need updating and if so, the constraints table may be updated with the new taskconstraint. The taskconstraint may be then associated with the task and the task added to the CCE execution queue. The queue may be then resorted, first by task priority. If both tasks have the same priority, the time may go to the task that has been in the queue the longest.

Figure 10:
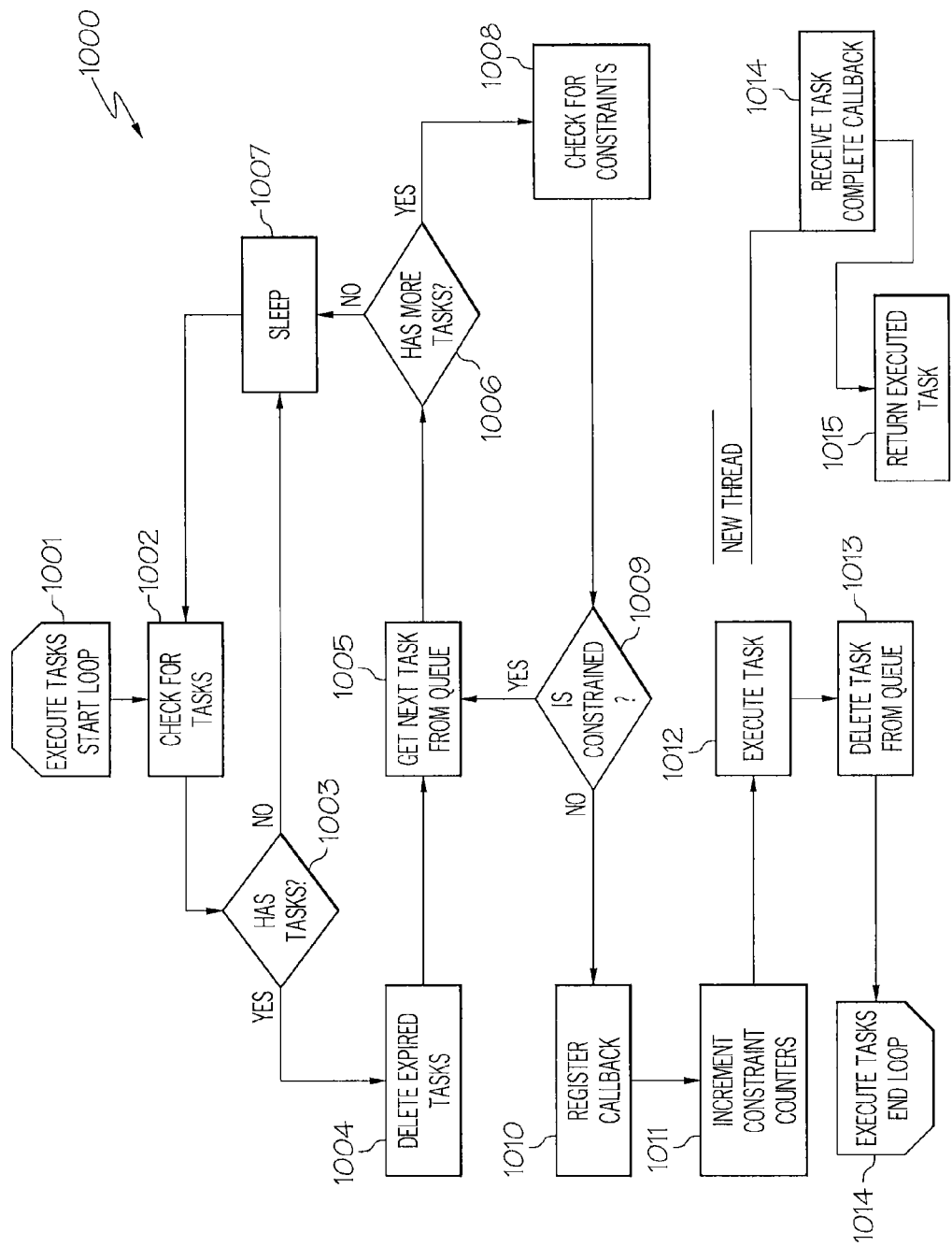
FIG. 10 is a flowchart for a process for CCEJ task execution according to an example embodiment of the present invention.

FIG. 10 is a flowchart for a process for CCEJ task execution according to an example embodiment of the present invention. In the process 1000 in block 1001, tasks "Start Loop" may be executed and in block 1002, a check may be made for a task and then in block 1003, it may be determined if there are any tasks. If there are no tasks, then in block 1007 a CCEJ task executor may sleep. If in block 1003, there are tasks, then in block 1004 expired tasks may be deleted and then in block 1005 the next task from the queue may be obtained. In block 1006, it may be determined if there are more tasks and if not, in block 1007 the task executor may sleep. If there are more tasks then in block 1008, a check may be made for constraints. Then in block 1009, it may be determined whether the task is constrained and, if so, in block 1005, the next task may be obtained from the queue, and in block 1006, and a determination may be determined if there are more tasks and the process proceeds to either block 1007 or block 1008 as noted previously. If the task is not constrained, then in block 1010, a callback may be registered. Then in block 1011 constraint counters may be incremented and in block 1012, the task may be executed. Then in block 1013, the task may be deleted from the queue and in block 1014, a task "End Loop" may be executed. Further, if there is a new thread, in block 1014, the task complete callback may be received and in block 1015, the executed task may be returned.

Therefore, according to embodiments of the present invention, upon startup, CCE may first check to see if there are tasks in the execution queue. If tasks exist, the CCE may loop through each entry in the execution queue and delete any tasks that have expired. The CCE may then again loop through the remaining tasks in the queue. For each task, it is determine if the particular CCEJ command is constrained or limited. If the task is constrained or limited, the CCE may break out of the loop. If the task is not constrained, a callback may be registered so it is known when the command has completed. This may be necessary since each task may be executed in its own thread. The command counters for each limit may be incremented before the task actually executes for accurate command throttling. The task may be then submitted to the thread pool and its run method executed. Now that the task is executing in new thread, it may be deleted from the queue. When the task finishes executing, the notification may be sent, to the callback method and the command counters for each limit may be decremented. The executed task may be then sent back to the calling process.

Figure 11:
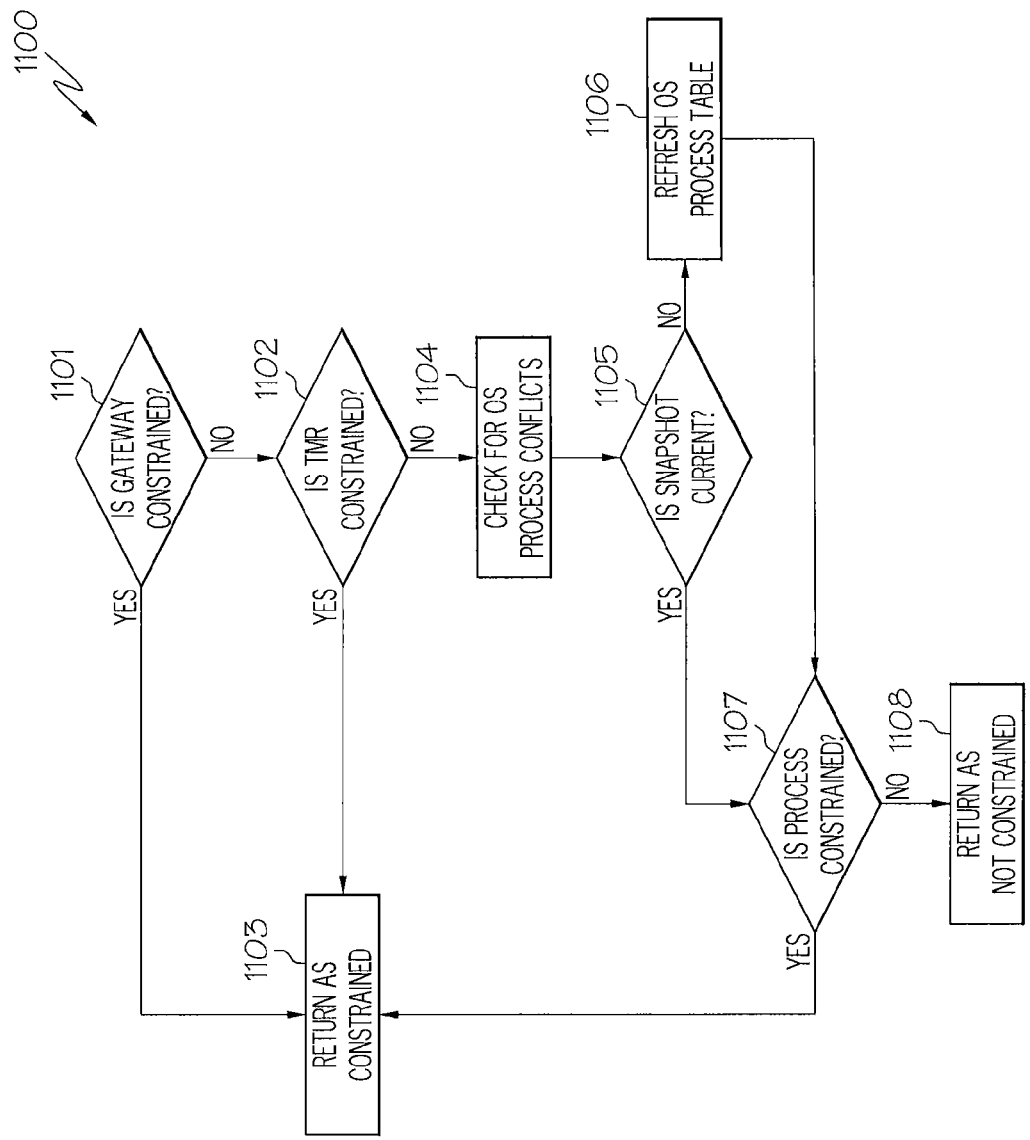
FIG. 11 is a flowchart for a process for checking CCEJ constraints according to an example embodiment of the present invention

FIG. 11 shows a flowchart for a process for checking CCEJ constraints according to an example embodiment of the present invention. In the process 1100, in block 1101, it may be determined if a gateway is constrained. If the gateway is constrained, then in block 1102, it may be determined if a TMR is constrained and, if so, then in block 1103, a "constrained" may be returned. If the gateway is constrained, then in block 1103, a "constrained" may be returned. If the TMR is not constrained, then in block 1104, a check may be made for OS process conflicts. Then in block 1105, it may be determined if a snapshot is current and, if not, then in block 1106, the OS process table may be refreshed and in block 1107, a determination made if the process is constrained. If the snapshot is current, then in block 1107, it may be determined if the process is constrained. If the process is constrained, then in block 1103, a "constrained" may be returned. If the process is not constrained, then in block 1108, a "not constrained" may be returned.

According to embodiments of the present invention, a task may not execute if its command type has reached certain limits or has conflicts with currently executing OS process. CCEJ command may be checked to see if it constrained or limited by factors such as, for example, a total number of commands executing on a TMR, a total number of commands executing on a particular gateway, a number of like processes currently running on the system, conflicting processes currently running, etc. In order to determine if one or more processes are currently executing as indicated in the operating system process table, the operating system process table may be checked to see if it is current and if not, the table may be refreshed.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for adding a new endpoint device to a systems management infrastructure, the method comprising:
   receiving, at a gateway device, an endpoint device login request that includes endpoint data, wherein the endpoint data includes object identification (OID) associated with the endpoint device, Internet Protocol (IP) address, and region number of the endpoint device within the systems management infrastructure;
   communicating, via a computing device processor, an endpoint data message from the gateway device to a business process automation application, wherein the business process automation web service is an abstraction layer application overlaying the systems management infrastructure;
   determining, via a computing device processor, if the endpoint device exists in a federated view of a business process automation web service, wherein the federated view provides for all endpoint devices managed by the system management infrastructure and one or more other system management infrastructures to be managed from a single workstation;
   adding, via a computing device processor, the endpoint data to the federated view if the endpoint device is determined to not exist in the federated view of the business process automation web service;
   determining, via a computing device processor, if the endpoint device is correctly assigned to the gateway device; and
   reassigning, via a computing device processor, the endpoint device to a correct gateway device if it is determined that the endpoint device is not correctly assigned to the gateway device, wherein reassigning the endpoint device includes communicating, via the business process automation application, an asynchronous reassignment command to the correct gateway device,
   wherein the business process automation application manages task distribution and status data gathering for all endpoint devices in the plurality of systems management infrastructures.

2. The method of claim 1, further determining, via a computing device, if processing commands should be executed at the endpoint device.

3. The method of claim 2, further comprising communicating, via the business process automation application, an asynchronous processing command to the endpoint device.

4. The method of claim 1, further comprising updating, via a computing device processor, the federated view with the endpoint data if the endpoint device is determined to exist in the federated view of the business process automation web service.

5. The method of claim 1, wherein the endpoint data further includes an endpoint label, and an endpoint version identifier.

6. The method of claim 1, further comprising communicating, via a computing device processor, the endpoint data to a messaging service for synchronous processing.

7. A system for endpoint device management within a systems management infrastructure, the system comprising:
   a first endpoint device managed by a first systems management infrastructure;
   a plurality of other endpoint devices managed by one or more other systems management infrastructures;
   a gateway device configured to receive a login request from the first endpoint device, wherein the request includes first endpoint device data, wherein the endpoint data includes object identification (OID) associated with the endpoint device, Internet Protocol (IP) address, and region number of the endpoint device within the systems management infrastructure; and
   a business process automation application residing in an abstraction layer overlaying the systems management infrastructures configured to (1) receive a first endpoint device data message communicated from the gateway device, (2) determine if the first endpoint device exists in a federated view of a business process automation web service, wherein the federated view provides for all endpoint devices managed by the plurality of system management infrastructures to be managed from a single workstation, (3) add the first endpoint device data to the federated view if the first endpoint device is determined to not exist in the federated view of the business process automation web service, (4) determine if the endpoint device is correctly assigned to the gateway device, and (5) reassign the endpoint device to a correct gateway device by communicating an asynchronous reassignment command to the correct gateway device if it is determined that the endpoint device is not correctly assigned to the gateway device, wherein the business process automation application is further configured to manage task distribution and status data gathering for all endpoint devices in the plurality of systems management infrastructures.

8. The system of claim 7, wherein the business process automation application is further configured to determine if processing commands should be executed at the endpoint device.

9. The system of claim 8, wherein the business process automation application is further configured to communicate an asynchronous processing command to the endpoint device.

10. The system of claim 7, wherein the business process automation application is further configured to update the federated view with the first endpoint device data if the first endpoint device is determined to exist in the federated view of the business process web service.

11. The system of claim 7, wherein the first endpoint device data further includes an endpoint label, and an endpoint version identifier.

12. The system of claim 7, a messaging service configured to receive the first endpoint device data from the business process automation application for synchronous processing.

13. A computer program product, the computer program product comprising a non-transitory computer-readable medium having computer-executable instructions to cause a computer to implement the steps of:

receiving, at a gateway device, an endpoint device login request that includes endpoint data, wherein the endpoint data includes object identification (OID) associated with the endpoint device, Internet Protocol (IP) address, and region number of the endpoint device within the systems management infrastructure;

communicating an endpoint data message from the gateway device to a business process automation application, wherein the business process automation web service is an abstraction layer application overlaying the systems management infrastructure;

determining if the endpoint device exists in a federated view of the business process automation web service, wherein the federated view provides for all endpoint devices managed by the system management infrastructure and one or more other system management infrastructures to be managed from a single workstation; and adding the endpoint data to the federated view if the endpoint device is determined to not exist in the federated view of the business process automation web service determining if the endpoint device is correctly assigned to the gateway device; and reassigning the endpoint device to a correct gateway device if it is determined that the endpoint device is not correctly assigned to the gateway device, wherein reassigning the endpoint device includes communicating an asynchronous reassignment command to the correct gateway device, wherein the business process automation application manages task distribution and status data gathering for all endpoint devices in the plurality of systems management infrastructures.

14. The computer program product of claim 13, wherein the computer-executable instructions further cause a computer to implement the step of updating the federated view with the endpoint data if the endpoint device is determined to exist in the federated view of the business process web service.

15. The computer program product of claim 14, wherein the computer-executable instructions further cause a computer to implement the step of communicating the endpoint data to a messaging service for synchronous processing.

* * * * *